US008991216B2

United States Patent
Gallagher et al.

(10) Patent No.: US 8,991,216 B2
(45) Date of Patent: *Mar. 31, 2015

(54) PULLING ROLLS WITH DEFLECTION LIMITATION FOR USE IN GLASS MANUFACTURING AND PROCESSES INCORPORATING THE SAME

(71) Applicants: Michael Thomas Gallagher, Corning, NY (US); George Clinton Shay, Hardy, VA (US); Izhar Zahoor Ahmed, Painted Post, NY (US); Nicholas Ryan Wheeler, Corning, NY (US); Ralph Alfred Langensiepen, Cape Coral, FL (US)

(72) Inventors: Michael Thomas Gallagher, Corning, NY (US); George Clinton Shay, Hardy, VA (US); Izhar Zahoor Ahmed, Painted Post, NY (US); Nicholas Ryan Wheeler, Corning, NY (US); Ralph Alfred Langensiepen, Cape Coral, FL (US)

(73) Assignee: Corning Incorporated, Corning, NY (US)

( * ) Notice: Subject to any disclaimer, the term of this patent is extended or adjusted under 35 U.S.C. 154(b) by 74 days.

This patent is subject to a terminal disclaimer.

(21) Appl. No.: 13/675,662

(22) Filed: Nov. 13, 2012

(65) Prior Publication Data

US 2014/0130551 A1     May 15, 2014

(51) Int. Cl.
C03B 13/16   (2006.01)
C03B 17/06   (2006.01)
C03B 35/18   (2006.01)

(52) U.S. Cl.
CPC ............. *C03B 17/068* (2013.01); *C03B 35/185* (2013.01); *C03B 13/16* (2013.01)
USPC .............................. 65/253; 65/370.1; 492/33

(58) Field of Classification Search
CPC ...... C03B 13/16; C03B 17/068; C03B 35/16; C03B 35/18; C03B 35/181; C03B 35/185; C03B 35/189

USPC ..................... 65/90; 492/30, 31, 33, 34, 40
See application file for complete search history.

(56) References Cited

U.S. PATENT DOCUMENTS

| 3,116,053 | A | * | 12/1963 | Ericsson | 432/236 |
| 3,338,696 | A | | 8/1967 | Dockerty | 65/145 |
| 3,661,548 | A | * | 5/1972 | Ito et al. | 65/182.4 |
| 3,682,609 | A | | 8/1972 | Dockerty | 65/83 |
| 5,257,965 | A | * | 11/1993 | Fuchs et al. | 492/6 |
| 5,908,680 | A | | 6/1999 | Moren et al. | 428/40.1 |
| 7,143,797 | B2 | | 12/2006 | Vannan | 152/7 |

(Continued)

FOREIGN PATENT DOCUMENTS

WO     2010/141832 A1    12/2010

OTHER PUBLICATIONS

International Search Report dated Feb. 12, 2014.

*Primary Examiner* — Cynthia Szewczyk
(74) *Attorney, Agent, or Firm* — Matthew J. Mason

(57) ABSTRACT

In one embodiment, a pulling roll for drawing glass sheet in a down-draw process includes a shaft member and a compliant cover assembly positioned on the shaft member. The compliant cover assembly includes at least one traction disk and at least one deflection limiting disk positioned on the shaft member. The at least one traction disk includes an annular hub and a plurality of spring elements integrally formed with the annular hub. The at least one deflection limiting disk includes at least one deflection limiting element positioned on each deflection limiting disk. The at least one deflection limiting element engages at least a portion of at least one traction disk upon a predetermined amount of inward radial deflection of the plurality of spring elements, thereby limiting the inward radial deflection of the plurality of spring elements.

17 Claims, 12 Drawing Sheets

(56) References Cited

U.S. PATENT DOCUMENTS

| | | | |
|---|---|---|---|
| 8,549,753 B2 | 10/2013 | Neubauer | 29/895.213 |
| 2002/0104358 A1 | 8/2002 | Hart | 72/251 |
| 2004/0192526 A1 | 9/2004 | Nakayama et al. | 492/40 |
| 2005/0212158 A1 | 9/2005 | Kaiser | 264/40.5 |
| 2007/0213188 A1* | 9/2007 | Yao | 492/16 |
| 2009/0283185 A1 | 11/2009 | Manesh et al. | 152/11 |
| 2010/0218559 A1 | 9/2010 | Bucko | 65/253 |
| 2012/0297836 A1* | 11/2012 | Cook et al. | 65/370.1 |

* cited by examiner

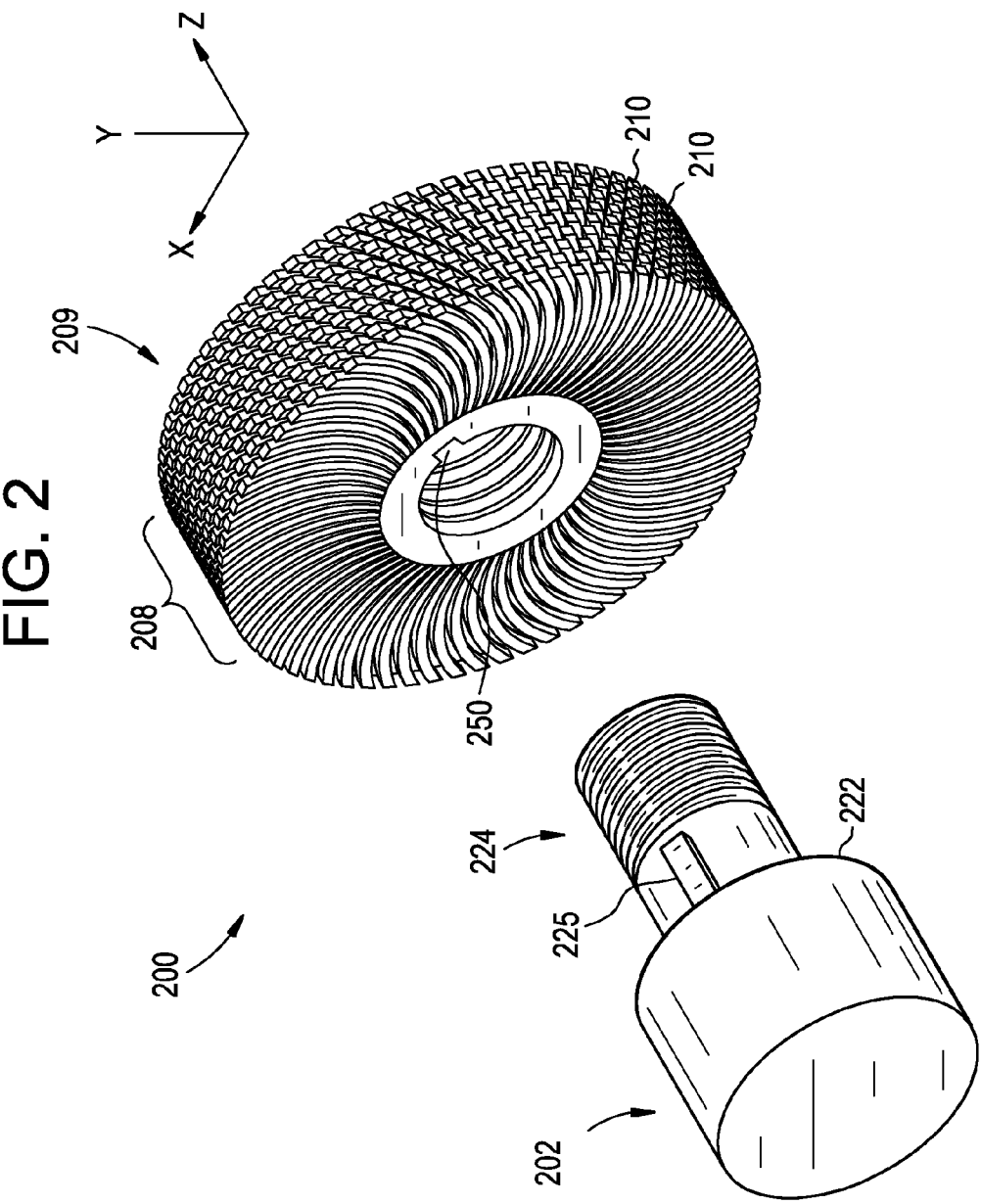

PULLING ROLLS WITH DEFLECTION LIMITATION FOR USE IN GLASS MANUFACTURING AND PROCESSES INCORPORATING THE SAME

BACKGROUND

1. Field

The present specification generally relates to pulling rolls for use in the manufacture of glass sheets and, more specifically, to pulling rolls comprising spring elements for applying a drawing force to glass sheets.

2. Technical Background

Pulling rolls are used in the manufacture of sheet glass to apply tension to a ribbon or web of glass from which individual sheets of glass are formed. The amount of tension applied by the pulling rolls to the glass is utilized to control the nominal thickness of the glass as the glass is drawn from molten glass, such as in an overflow down-draw fusion process, as described in U.S. Pat. Nos. 3,338,696 and 3,682,609, or in similar glass manufacturing processes.

Pulling rolls are generally designed to contact the glass web at its outer edges, usually in an area just inboard of the thickened beads that form at the very edges of the glass web. Because the pulling rolls are in direct contact with the surface of the glass web, damage to the surface of the glass can occur due to the wear characteristics of the pulling roll material. For example, glass particles can become embedded in the surface of the pulling roll resulting in damage to the glass as the pulling rolls contact the glass.

Similarly, the pulling roll may shed particulate matter if the material of the pulling roll degrades with use at the elevated temperatures of the glass drawing process. This particulate matter may become embedded in the soft glass thereby forming defects in the glass. In addition, particulate matter generated from the glass drawing process (e.g., debris, dust, glass shards and the like) may become embedded in the surface of the pulling roll thereby creating repetitive defects in the glass web. Damage to the glass web caused by any of these mechanisms may result in uncontrolled and/or premature breakage of the glass sheet during the drawing process thereby decreasing manufacturing efficiencies and increasing costs.

In addition, particulate matter generated from the glass drawing process may cause the pulling roll to lift off the glass sheet, resulting in a concentrated normal force to bear on not only the sheet but also the pulling roll, which could cause permanent deformations in the pulling roll material.

Accordingly, alternative designs for pulling rolls for use in glass manufacturing processes are needed.

SUMMARY

The embodiments described herein relate to pulling rolls for use in glass drawing processes that reduce the occurrence of premature and/or uncontrolled breakage of the glass sheets drawn with the pulling rolls. Also disclosed are methods for forming glass sheets utilizing pulling rolls that mitigate premature and/or uncontrolled breakage of the glass sheets during a glass drawing process.

According to one embodiment, a pulling roll for reducing premature and/or uncontrolled breakage in glass sheets may include a shaft member and a compliant cover assembly positioned on the shaft member. The compliant cover assembly may include at least one traction disk and at least one deflection limiting disk positioned on the shaft member. The at least one traction disk may include an annular hub and a plurality of spring elements integrally formed with the annular hub. The plurality of spring elements may project outward from the annular hub such that an end of each spring element of the plurality of spring elements is positioned radially outward from a base of each spring element of the plurality of spring elements. In addition, the at least one deflection limiting disk includes at least one deflection limiting element positioned on the deflection limiting disk, the at least one deflection limiting element engaging at least a portion of the traction disk upon a predetermined amount of inward radial deflection of the plurality of spring elements, thereby limiting the inward radial deflection of the plurality of spring elements. In another embodiment, a pulling roll for reducing premature and/or uncontrolled breakage in glass sheets may include a shaft member and a compliant cover assembly positioned on the shaft member. The compliant cover assembly may include a plurality of traction disks and a plurality of deflection limiting disks positioned on the shaft member. Each traction disk of the plurality of traction disks may be rotationally offset from adjacent traction disks and each traction disk of the plurality of traction disks may include an annular hub and a plurality of spring elements integrally formed with the annular hub. The plurality of spring elements may project outward from the annular hub such that an end of each spring element of the plurality of spring elements is positioned radially outward from a base of each spring element of the plurality of spring elements. Each deflection limiting disk of the plurality of deflection limiting disks includes at least one deflection limiting element positioned on each deflection limiting disk, the at least one deflection limiting element engaging at least a portion of at least one traction disk upon a predetermined amount of inward radial deflection of the plurality of spring elements, thereby limiting the inward radial deflection of the plurality of spring elements.

In yet another embodiment, a method for forming a glass sheet that reduces premature and/or uncontrolled breakage in the glass sheet may include melting glass batch materials to form molten glass and forming the molten glass into a glass sheet. Thereafter, at least a first surface of the glass sheet may be contacted with at least one pulling roll to convey the glass sheet in a downstream direction. The at least one pulling roll may include a shaft member and a compliant cover assembly positioned on the shaft member. The compliant cover assembly may include a plurality of traction disks and a plurality of deflection limiting disks positioned on the shaft member. Each of the plurality of traction disks may include an annular hub integrally formed with a plurality of spring elements projecting outward from the annular hub such that an end of each of the plurality of spring elements is located radially outward from a base of each of the plurality of spring elements. Each deflection limiting disk of the plurality of deflection limiting disks includes at least one deflection limiting element positioned on each deflection limiting disk, the at least one deflection limiting element engaging at least a portion of at least one traction disk upon a predetermined amount of inward radial deflection of the plurality of spring elements, thereby limiting the inward radial deflection of the plurality of spring elements. Additional features and advantages of the present disclosure will be set forth in the detailed description that follows, and in part will be readily apparent to those skilled in the art from that description or recognized by practicing the embodiments described herein, including the detailed description that follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 2 schematically depicts a partially exploded view of a pulling roll formed from a plurality of traction disks according to one or more embodiments shown and described herein;

DETAILED DESCRIPTION

Figure 1A:
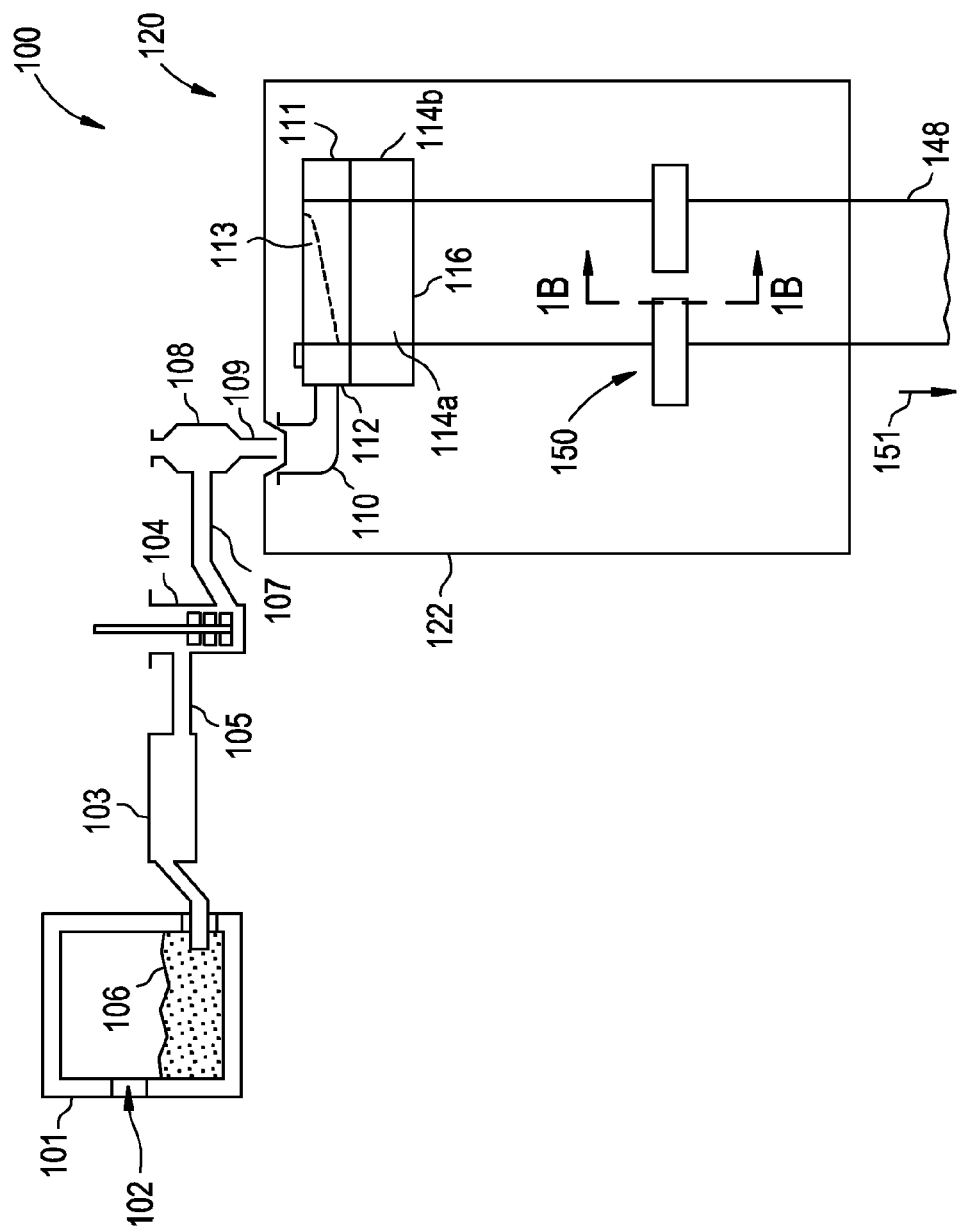
FIG. 1A schematically depicts a glass drawing apparatus for forming glass sheets according to one or more embodiments shown and described herein.

Reference will now be made in detail to various embodiments of pulling rolls for use in the manufacture of glass sheets and glass manufacturing processes incorporating the same. Whenever possible, the same reference numerals will be used throughout the drawings to refer to the same or like parts. Glass sheet materials may generally be formed by melting glass batch materials to form molten glass and thereafter forming the molten glass into a glass sheet. Exemplary processes include the float glass process, the slot draw process and the fusion down-draw process. In each of these processes, one or more pulling rolls may be utilized to contact the glass sheet and convey the glass sheet in a downstream direction.

Referring to FIG. 1A by way of example, an exemplary glass manufacturing apparatus 100 for forming glass sheet material from molten glass is schematically depicted in which a fusion draw machine is used to form the molten glass into glass sheets. The glass manufacturing apparatus 100 includes a melting vessel 101, a fining vessel 103, a mixing vessel 104, a delivery vessel 108, and a fusion draw machine (FDM) 120. Glass batch materials are introduced into the melting vessel 101 as indicated by arrow 102. The batch materials are melted to form molten glass 106. The fining vessel 103 has a high temperature processing area that receives the molten glass 106 from the melting vessel 101 and in which bubbles are removed from the molten glass 106. The fining vessel 103 is coupled to the mixing vessel 104 by a connecting tube 105. That is, molten glass flowing from the fining vessel 103 to the mixing vessel 104 flows through the connecting tube 105. The mixing vessel 104 is, in turn, coupled to the delivery vessel 108 by a connecting tube 107 such that molten glass flowing from the mixing vessel 104 to the delivery vessel 108 flows through the connecting tube 107.

The delivery vessel 108 supplies the molten glass 106 through a downcomer 109 into the FDM 120. The FDM 120 comprises an enclosure 122 in which an inlet 110, a forming vessel 111 and at least one draw assembly 150 are positioned. As shown in FIG. 1A, the molten glass 106 from the downcomer 109 flows into an inlet 110 that leads to the forming vessel 111. The forming vessel 111 includes an opening 112 that receives the molten glass 106 that flows into a trough 113 and then overflows and runs down two converging sides 114a and 114b before fusing together at a root, where the two sides join, before being contacted and drawn in a downstream direction 151 by the draw assembly 150 to form a continuous glass sheet 148.

Figure 1B:
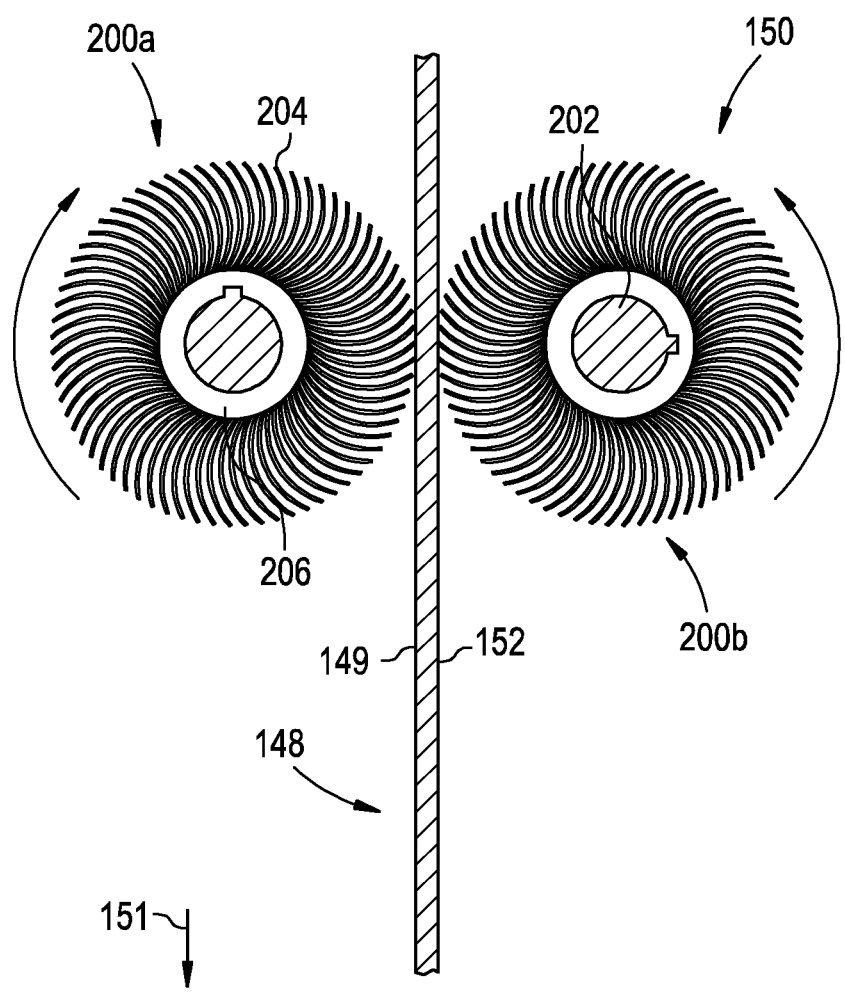
FIG. 1B schematically depicts a cross section of a draw assembly comprising a pair of opposed pulling rolls for use in drawing a glass sheet.

Referring to FIG. 1B, a cross section of the draw assembly 150 is schematically depicted. As shown in FIG. 1B, the draw assembly 150 generally comprises a pair of opposed pulling rolls 200a, 200b that contact the glass sheet 148 on opposite sides. Accordingly, it should be understood that the glass sheet 148 is impinged between the pulling rolls 200a, 200b. The pulling rolls 200a, 200b may be powered (i.e., the pulling rolls 200a, 200b are actively rotated and thus impart a drawing force that conveys the glass sheet 148 in the downstream direction 151) or passive (i.e., the pulling rolls 200a, 200b contact the glass sheet 148 and stabilize the glass sheet as it is drawn in the downstream direction 151 by other pulling rolls).

While the pulling rolls 200a, 200b have been described herein as being used in conjunction with an apparatus that utilizes a fusion draw machine to form the glass sheet, it should be understood that the pulling rolls may be used with similar processes in which glass batch materials are melted to form molten glass and the molten glass is then formed into a glass sheet and drawn with pulling rolls. By way of example and not limitation, the pulling rolls described herein may also be utilized in conjunction with up-draw processes, slot-draw processes, float-draw processes and other, similar glass drawing processes. The pulling rolls may also be used in the drawing of canes and tubing.

As briefly described hereinabove, the pulling rolls used in the aforementioned processes are in direct contact with the glass sheet and, as such, damage to the surface of the glass can occur due to the wear characteristics of conventional pulling rolls. For example, glass particles can become embedded in the surface of conventional pulling rolls resulting in damage to the glass as the pulling rolls contact the glass. Similarly, conventional pulling rolls may degrade with prolonged use at elevated temperatures and shed particulate matter. This particulate matter may become embedded in the soft glass, thereby forming defects in the glass. Regardless of the source, such defects and/or damage may lead to premature and/or uncontrolled breakage of the glass sheet during the glass drawing process thereby reducing manufacturing efficiencies and increasing costs. The pulling rolls described herein utilize spring elements to contact the glass sheet. The spring elements are formed from materials that are stable at elevated temperatures and, therefore, the pulling rolls do not readily degrade after prolonged use or shed particulate matter. Moreover, the pulling rolls are formed with an open structure between the spring elements such that particulate matter can be readily enveloped in the body of the pulling roll rather than embedded into the surface of the pulling roll.

Referring now to FIG. 2, an exemplary pulling roll 200 for use in a glass manufacturing process is schematically depicted. The pulling roll 200 generally includes a shaft member 202 and a compliant cover assembly 208 that is positioned on the shaft member 202. The compliant cover assembly 208 comprises a plurality of traction disks 210 positioned on the shaft member 202 and forming a contact surface 209 of the compliant cover assembly. While the embodiment of the pulling roll 200 depicted in FIG. 2 includes a plurality of traction disks, it should be understood that the compliant cover assembly 208 may be formed from a single traction disk.

The shaft member 202 may include threads 224 on one end while the opposing end is formed with a shoulder 222. The traction disks 210 may be positioned against the shoulder and secured on the shaft member with a nut or another suitable fastener such as, for example, a taper pin. The shoulder 203 may also facilitate securing the pulling roll 200 to a frame or a mechanism for actively rotating the pulling roll 200. In some embodiments described herein, the shaft member 202 further comprises a key 225 for engaging with a corresponding keyway 250 formed in the traction disks 210 of the compliant cover assembly 208, as shown in FIG. 2. In other embodiments (not shown), the shaft member is formed with a keyway for engaging with a corresponding key formed in the traction disks. The interaction between the key and keyway prevents the traction disks 210 from rotating on the shaft member 202 as the pulling roll 200 is rotated.

Figure 3:
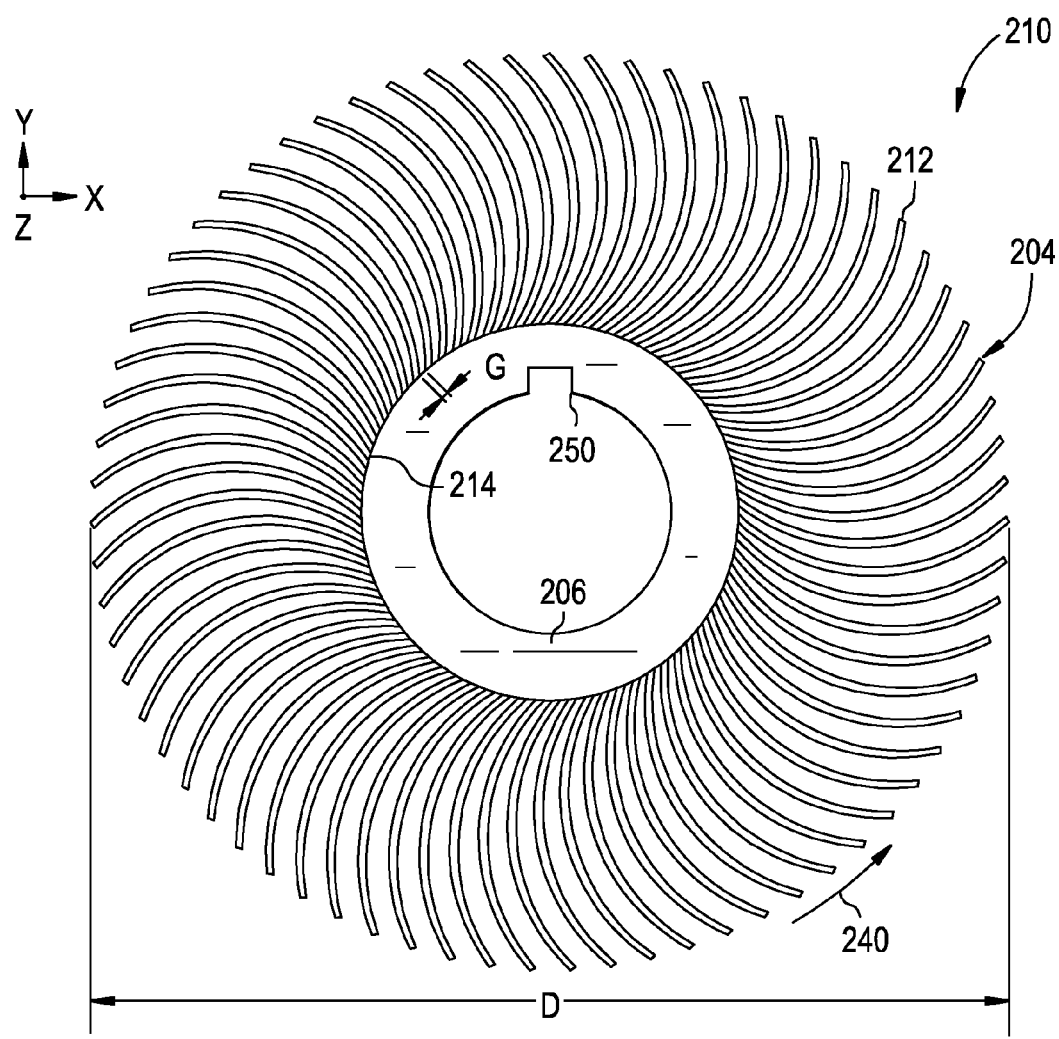
FIG. 3 schematically depicts a traction disk of the pulling roll of FIG. 2 according to one or more embodiments shown and described herein.
Figure 4:
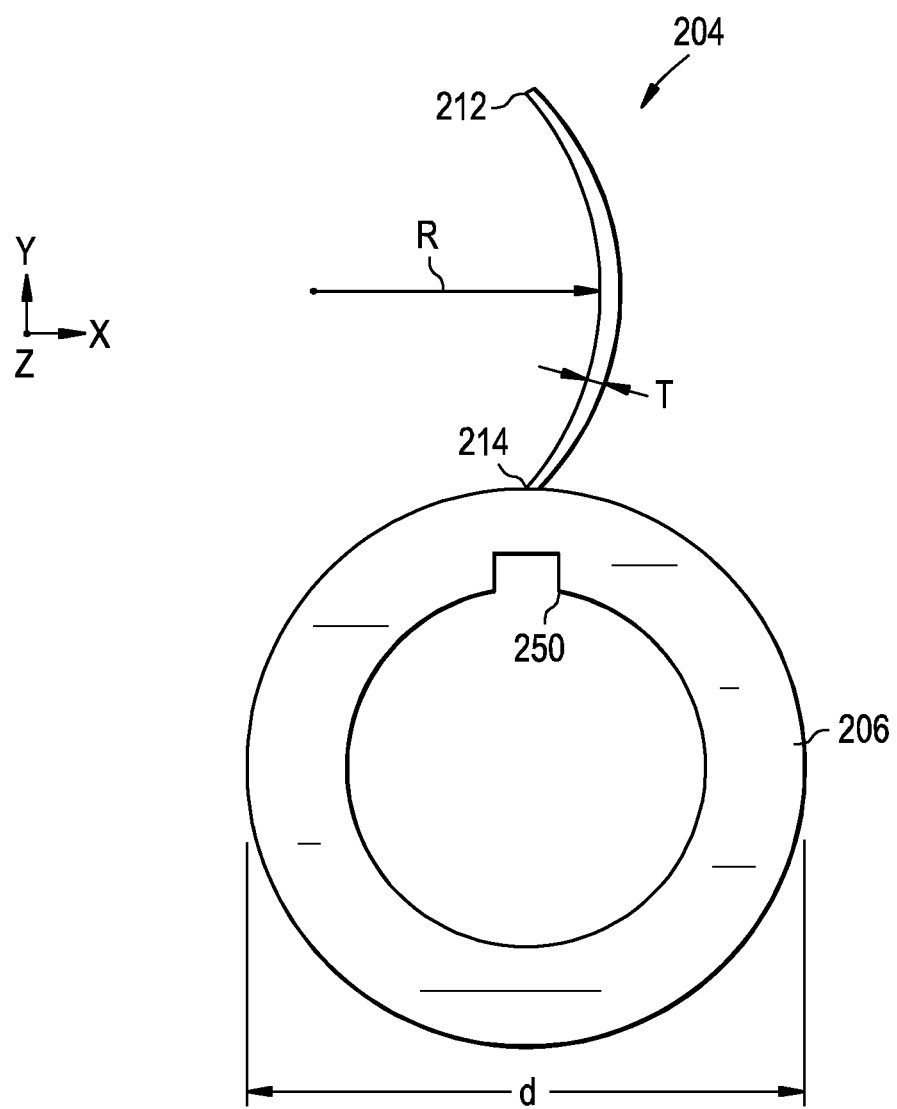
FIG. 4 schematically depicts the annular hub and a single spring element of the traction disk of FIG. 3 for purposes of illustration.

Referring now to FIGS. 3 and 4, a traction disk 210 for use in a compliant cover assembly of a pulling roll 200 is schematically depicted. In the embodiments described herein, the traction disks 210 generally comprise an annular hub 206 and a plurality of spring elements 204. The plurality of spring elements 204 are integrally formed with the annular hub 206 and project radially outward from the annular hub 206 as depicted in FIG. 3. As best shown in FIG. 4, each spring element 204 extends between a base 214 and end 212. Specifically, each spring element 204 is integrally attached to the annular hub 206 at the base 214 such that end 212 of the spring element is positioned radially outward from the base 214 and the annular hub 206. In the embodiment of the traction disk 210 depicted in FIG. 3, the annular hub 206 and the plurality of spring elements 204 are substantially co-coplanar.

The spring elements 204 of each traction disk 210 are designed to elastically flex with respect to the annular hub 206 such that, when the pulling rolls are pressed into contact with the surface of a glass sheet to apply a drawing force to the glass sheet, the spring elements 204 elastically displace with respect to the annular hub 206. As a result, the spring elements 204 do not damage the glass sheet while providing a drawing force to the glass sheet.

More specifically, the spring elements 204 of each traction disk can have a radial spring constant (i.e., a spring constant along a radial projection from the annular hub 206) in a range from about 2 lbf/mm to about 2000 lbf/mm (about 8.9 N/mm to about 8896.4 N/mm) or even from about 5 lbf/mm to about 1500 lbf/mm (22.2 N/mm to about 6672.3 N/mm). Spring constants falling within these ranges produce a pulling roll that is sufficiently compliant so as not to damage the glass sheet while, at the same time, being firm enough to provide an adequate traction force against the surface of the glass sheet to facilitate drawing the glass sheet with the pulling roll.

As noted above, debris, such as glass shards or other particulate matter, may contact the pulling roll during the downdraw process. In order to prevent the debris from becoming embedded in the contact surface of the compliant cover assembly of the pulling roll and thereby damaging a glass sheet drawn with the pulling roll, the spring elements 204 of the traction disk 210 are sufficiently compliant in the axial and tangential directions such that, when debris is impinged between the contact surface of the compliant cover assembly, the spring elements displace tangentially and/or axially such that the debris passes between the spring elements allowing the debris to completely pass through the pulling roll or become enveloped in the compliant cover assembly, away from the surface of the compliant cover assembly, thereby mitigating damage to the glass sheet. In the embodiments of the pulling roll described herein, the spring elements 204 generally have an axial spring constant (i.e., a spring constant in the +/− z-direction of the coordinate axes depicted in FIG. 3) that is sufficiently low to facilitate setting the roll tilt angle (i.e., the angle of long axis of the roll with respect to horizontal). For example, the axial spring constant may be from about 0.25 lbf/mm to about 150 lbf/mm (about 1.1 N/mm to about 667.2 N/mm) or even from about 5 lbf/mm to about 75 lbf/mm (about 22.2 N/mm to about 333.6 N/mm). The tangential spring constant (i.e., a spring constant in the direction of arrow 240) should be high enough to prevent excessive deflection at the ends of the spring elements that may interfere with maintaining constant sheet velocity. In the embodiments described herein, the tangential spring constant may be from about 2 lbf/mm to about 75 lb/mm (about 8.9 N/mm to about 333.6 N/mm) or even from about 5 lbf/mm to about 50 lbf/mm (about 22.2 N/mm to about 222.4 N/mm).

Referring now to FIGS. 2-4, in the embodiments of the pulling rolls described herein, the spring elements 204 of the traction disks 210 are formed on the annular hub such that a spacing G between the bases of adjacent spring elements 204 in the circumferential direction is greater than or equal to about 0.01 mm. This spacing is sufficient to permit debris to pass between circumferentially adjacent spring elements 204 rather than embedded in the contact surface 209 of the compliant cover assembly 208. In some embodiments, the spacing G may be greater than or equal to about 0.05 mm.

The thickness T of the spring elements 204 in the circumferential direction generally depends on the type of material from which the traction disks 210 are formed as well as the desired spring constants of the spring elements. In the embodiments described herein, the thickness T of the spring elements 204 is generally in the range from about 0.25 mm to about 3.00 mm. In some embodiments, the thickness T of the spring elements may be from about 0.25 mm to about 1.5 mm. However, it should be understood that the spring elements 204 may have other thicknesses depending on the type of material from which the traction disks 210 are made and/or the desired spring constants of the spring elements. Moreover, the thickness T of the spring elements 204 may by non-uniform between the base 214 and the end, as shown in FIG. 4 while, in other embodiments (not shown), the thickness of the spring elements 204 may be uniform between the base 214 and the end 212.

Still referring to FIGS. 2-4, in the embodiments of the pulling rolls 200 described herein, the annular hub 206 of the traction disks 210 generally has an outer diameter d in a range from about 18 mm to about 75 mm while an outer diameter D of the traction disk is in a range from about 60 mm to about 200 mm. Accordingly, it should be understood that the compliant cover assembly of the pulling roll 200 also has an outer diameter in a range from about 60 mm to about 200 mm.

The axial thickness t of the spring elements 204 (i.e., the thickness in the +/− z-direction of the coordinate axes depicted in FIG. 3) and the thickness of the annular hub 206 is generally in the range from about 0.50 mm to about 105 mm. Moreover, for a given material, the axial thickness t of the spring elements 204 may be increased or reduced in order to adjust the axial spring constant of the spring elements 204. In some embodiments, the axial thickness of the annular hub 206 may be greater than the axial thickness of the spring elements 204. In these embodiments, the annular hub 206 is utilized to achieve a desired spacing between axially adjacent spring elements 204 when the traction disks 210 are secured on the shaft member 202. Accordingly, it should be understood that the traction disks 210 may be formed with annular hubs having different thicknesses in order to achieve the desired spacing between axially adjacent spring elements.

In the embodiments of the pulling rolls 200 described herein, the spring elements 204 may be formed with a specific contour to achieve the desired mechanical response (i.e., the desired elastic deformation and stress) when the pulling rolls are pressed against a planar surface of a glass substrate. For example, FIGS. 2-4 depict one embodiment of a pulling roll 200 constructed from traction disks 210 with spring elements that are curved between the end 212 and the base 214 such that, when the ends of the spring elements are engaged with a planar surface of the glass sheet, the spring elements elastically deflect radially inward toward the center of the annular hub. In some embodiments, the radius of curvature R of the spring elements 204 is constant between the end 212 and the base 214. In these embodiments, the radius of curvature R may be from about 10 mm to about 80 mm or even from about 10 mm to about 40 mm. The spring elements 204 in these embodiments are generally curved in a direction opposite the down-draw rotational direction of the pulling roll such that the spring elements 204 readily flex when they contact the surface of the glass sheet. For example, the pulling roll 200a of FIG. 1B has a down-draw rotational direction in the clockwise direction while the spring elements 204 are curved in the counter-clockwise direction.

Figure 5:
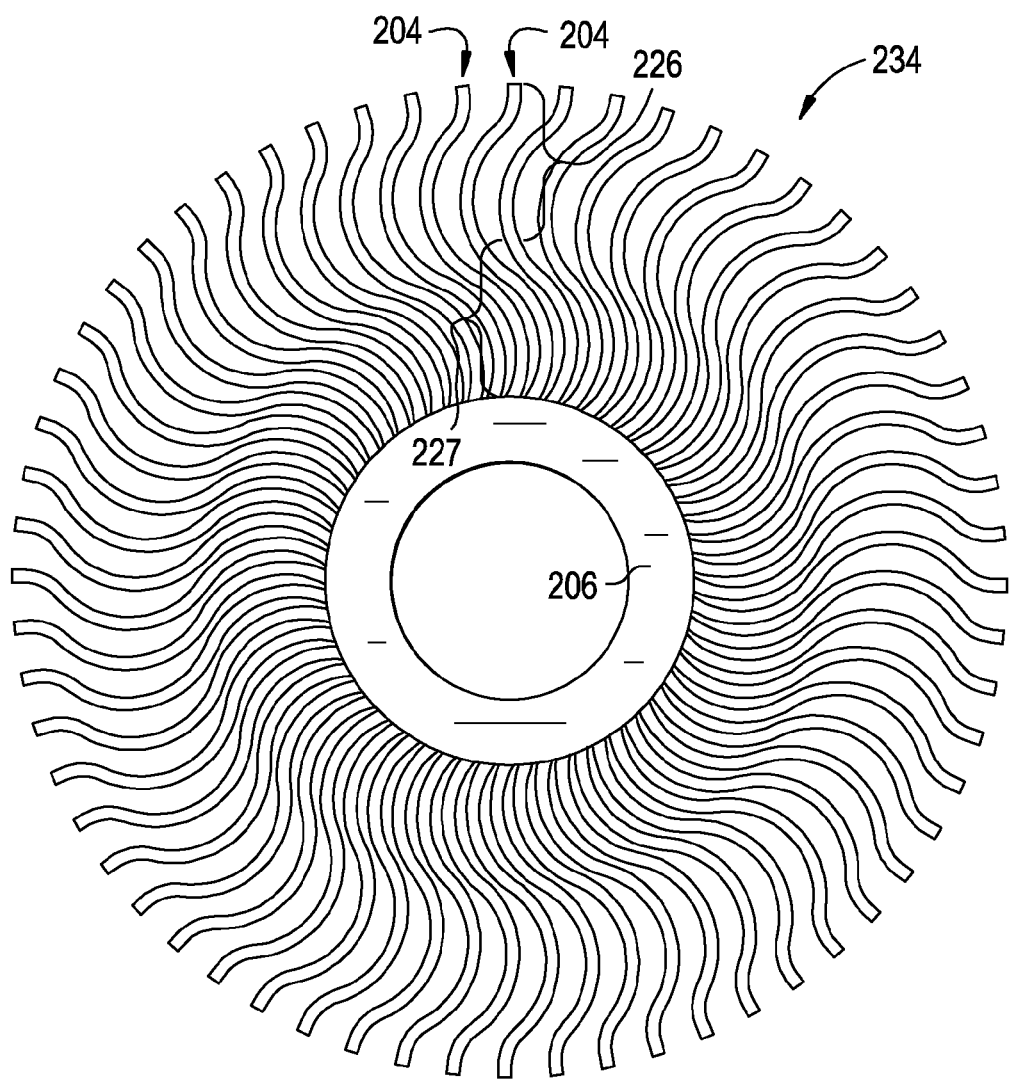
FIG. 5 schematically depicts a traction disk for a pulling roll in which the spring elements of the traction disk have complex curvatures.

In other embodiments, the spring elements 204 may have a complex curvature. For example, in some embodiments the radius of curvature of each spring element may increase from the base 214 of the spring element 204 to the end 212 of the spring element 204. In other embodiments, the radius of curvature of each spring element may decrease from the base 214 of the spring element to the end 212 of the spring element 204. In still other embodiments, the spring elements 204 may be formed with a complex curvature in which different segments of the spring element have different radii and/or are curved in different directions. For example, FIG. 5 depicts one embodiment of a traction disk 234 in which the spring elements have a lower portion 227 (i.e., the portion of the spring element closest to the annular hub 206) and an upper portion 226. In this embodiment, the lower portion 227 of each spring element 204 has a first radius of curvature and is curved in the counterclockwise direction while the upper portion 226 of the spring element 204 has a second, different radius of curvature and is curved in the clockwise direction. In these embodiments, the upper portion 226 of the spring element is generally curved in a direction opposite the down-draw direction of rotation of the pulling roll. Accordingly, in the embodiment of the traction disk 234 depicted in FIG. 5, the down-draw direction of the pulling roll would be in the counter-clockwise direction.

Figure 6:
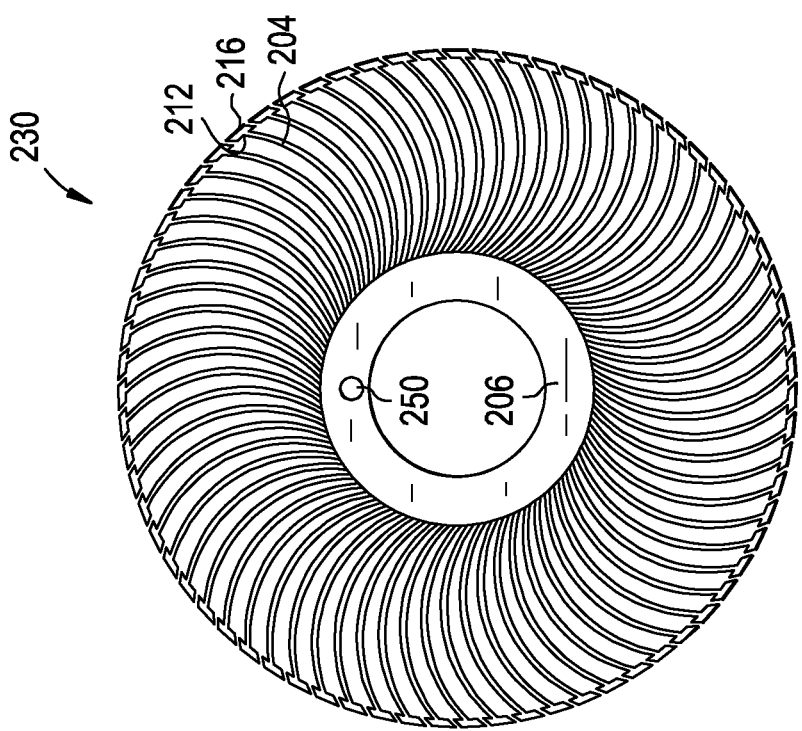
FIG. 6 schematically depicts a traction disk for a pulling roll in which the spring elements of the traction disk include a contact foot.

Referring now to FIG. 6, another embodiment of a traction disk 230 is schematically depicted. In this embodiment, the traction disk 230 is formed with spring elements 204 that include a contact foot 216 formed on the end 212 of each spring element 204. The contact foot 216 increases the contact area between the spring element 204 and the surface of a glass sheet drawn with the traction disk 230. Increasing the contact area between the spring elements 204 and the surface of the glass sheet increases the friction between the traction disk and the glass sheet that allows for a greater torque from the shaft member to be imparted to the glass sheet thereby increasing the down-draw force exerted on the glass sheet without decreasing the elasticity of the spring elements 204 thereby mitigating the potential for damage to the glass sheet during the down-draw process.

As noted hereinabove, the traction disks may be formed with keyways that prevent the traction disks from rotating on the shaft member. In the embodiment of the traction disk 230 depicted in FIG. 6, the keyway 250 is an aperture formed in the annular hub 206. The keyway 250 is shaped to receive a corresponding key (not shown) that is affixed to the shaft member thereby preventing rotation of the traction disk 230 on the shaft member.

Figure 7:
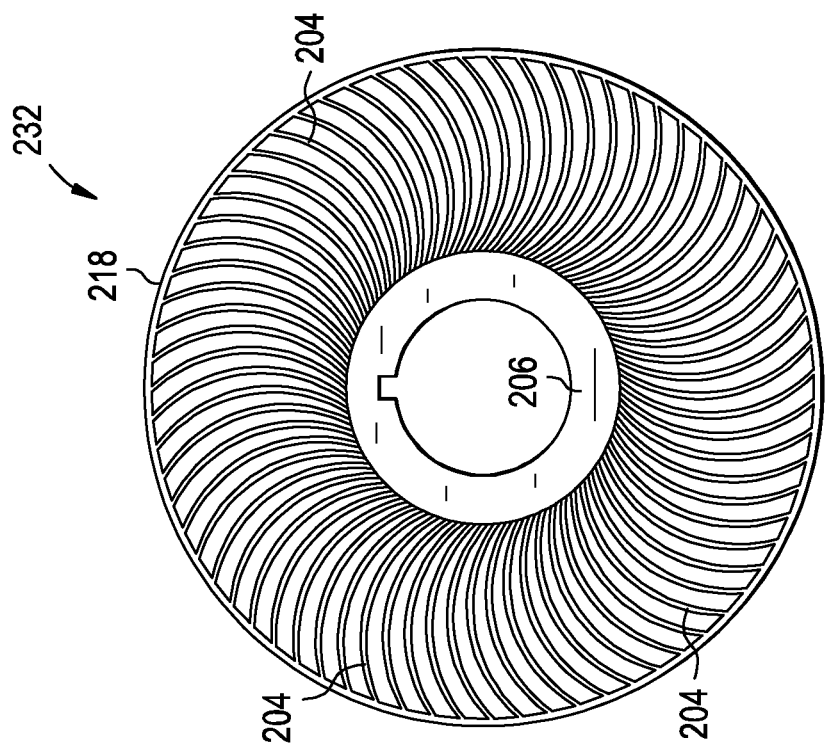
FIG. 7 schematically depicts a traction disk for a pulling roll in which the spring elements of the traction disk are joined by a rim.

Referring now to FIG. 7, another embodiment of a traction disk 232 is schematically depicted. In this embodiment, the traction disk 232 includes a rim 218. The rim 218 joins the end of each spring element of the plurality of spring elements to the end of an adjacent spring element on the same traction disk. In this embodiment, the rim 218 increases the contact area between the spring elements and the surface of a glass sheet drawn with the traction disk 232. Increasing the contact area between the spring elements 204 and the surface of the glass sheet with the rim 218 increases the friction between the traction disk and the glass sheet allowing for a greater torque to be applied to the glass sheet with the shaft member thereby increasing the down-draw force exerted on the glass sheet. Moreover, the curved spring elements 204 of the traction disk 232 allow the rim to be displaced with respect to the annular hub 206 thereby mitigating the potential for damage to the glass sheet during the down-draw process.

The traction disks depicted in FIGS. 3-7 may be formed from materials that retain their mechanical characteristics at the elevated temperatures encountered during a glass down-draw process that may reach up to about 900° C. Suitable materials include, without limitation, metals, ceramics, metal matrix composites, and mineral-based materials. For example, the traction disks may be formed from nickel-based alloys including, without limitation, Rene 41, Haynes 282, Inconel 718, or similar nickel-based alloys. Examples of suitable ceramic materials include, without limitation, silicon nitride, silicon carbide, alumina, boron carbide, SIALONs, or similar ceramic materials. Suitable mineral materials include, without limitation, bulk mica materials such as phlogopite mica. The traction disks depicted in FIGS. 3-9 may be formed using conventional machining techniques such as, for example, electro-discharge machining (EDM), laser metal sintering, or water jet machining techniques.

Once the traction disks are formed, the traction disks may be coated with a material that improves the oxidation resistance and wear resistance of the traction disks. For example, the traction disks may be coated with Stellite 6, Stellite 12 or other, similar coating materials that improve the oxidation and/or wear resistance of the traction disks.

In addition to the traction disks, pulling rolls as disclosed herein further include at least one deflection limiting disk positioned on the shaft member. Each deflection limiting disk can include at least one deflection limiting element positioned on the deflection limiting disk. The at least one deflection limiting element can engage at least a portion of the traction disk upon a predetermined amount of inward radial deflection of the plurality of spring elements, thereby limiting the inward radial deflection of the plurality of spring elements.

Limiting the inward radial deflection of the plurality of spring elements helps minimize the possibility of permanently deforming the spring elements, such as when particulate matter generated from the glass drawing process causes the pulling roll to lift off the glass sheet, resulting in a concentrated normal force to bear on not only the sheet but also the pulling roll.

Figure 8:
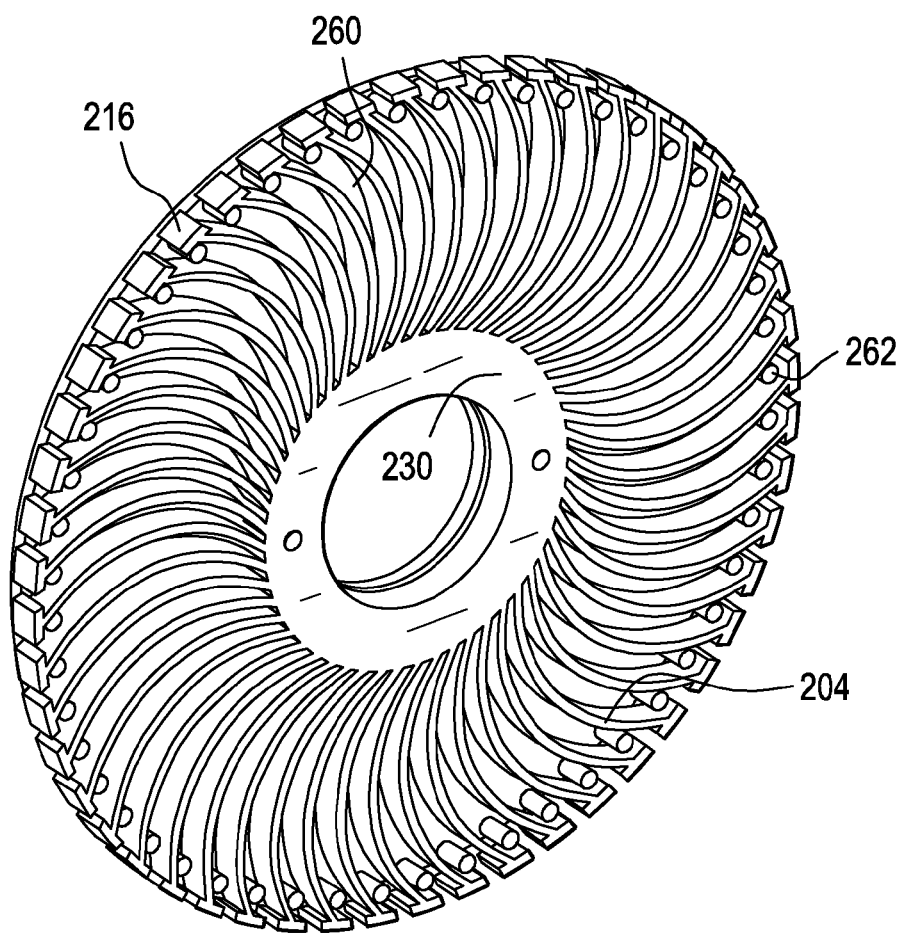
FIG. 8 schematically depicts a traction disk that is axially adjacent to a deflection limiting disk.

FIG. 8 illustrates an exemplary embodiment of a traction disk 230 that is axially adjacent to a deflection limiting disk 260. Traction disk 230 is similar to the embodiment shown in FIG. 6, wherein the spring elements include a contact foot 216 formed on the end 212 of each spring element 204. Deflection limiting disk 260 includes a plurality of pins 262, which are positioned circumferentially on the deflection limiting disk 260 and extend axially outward relative to the face of deflection limiting disk 260. Pins 262 act as deflection limiting elements. Specifically, pins 262 engage contact foot 216 upon a predetermined amount of inward radial deflection of each spring element 204, thereby limiting the inward radial deflection of each spring element 204.

Figure 9A:
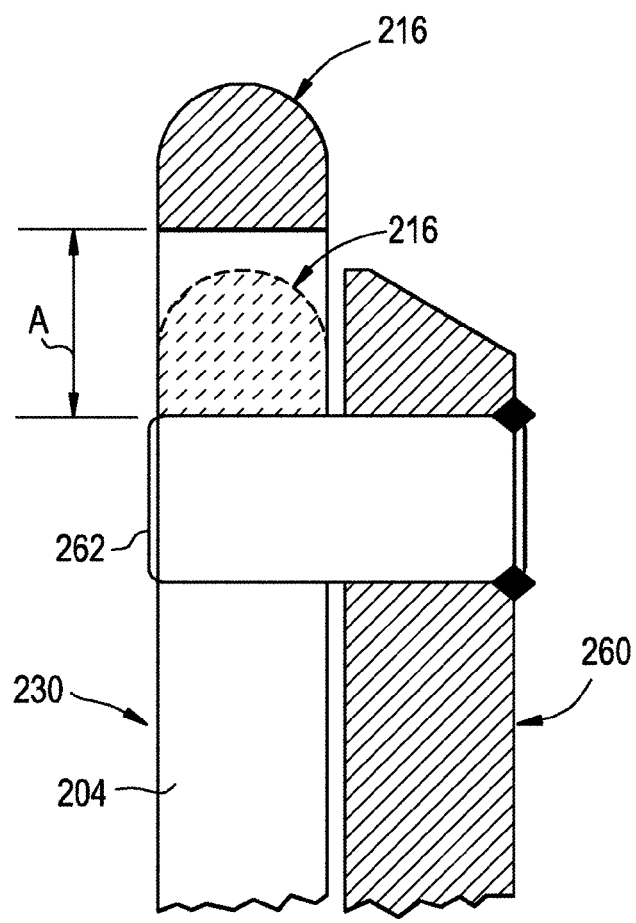
FIGS. 9A and 9B schematically depict exploded side and front views, respectively, of an outer radial area of traction disk and deflection limiting disk.
Figure 9B:
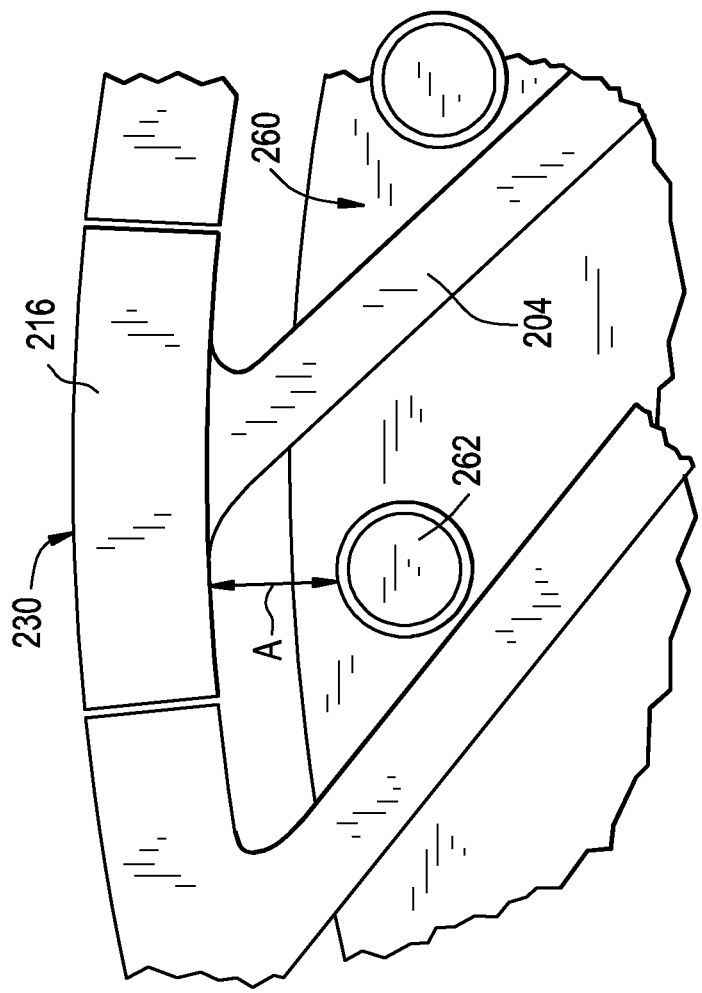

FIGS. 9A and 9B illustrate exploded side and front views, respectively, of an outer radial area of traction disk 230 and deflection limiting disk 260, wherein spring elements 204 of traction disk 230 are in an unstressed or undeflected state, such that gap A exists between radially outward surface of pins 262 and a radially inward surface of contact foot 216. Upon sufficient application of force to contact foot 216, spring elements 204 deflect in a radial inward direction until radially inward surface of contact foot 216 engages radially outward surface of a pin 262, at which point radial inward deflection of spring elements 204 is terminated, even where substantial additional force is applied that would otherwise cause spring elements 204 to continue to deflect radially inwardly.

Figure 10:
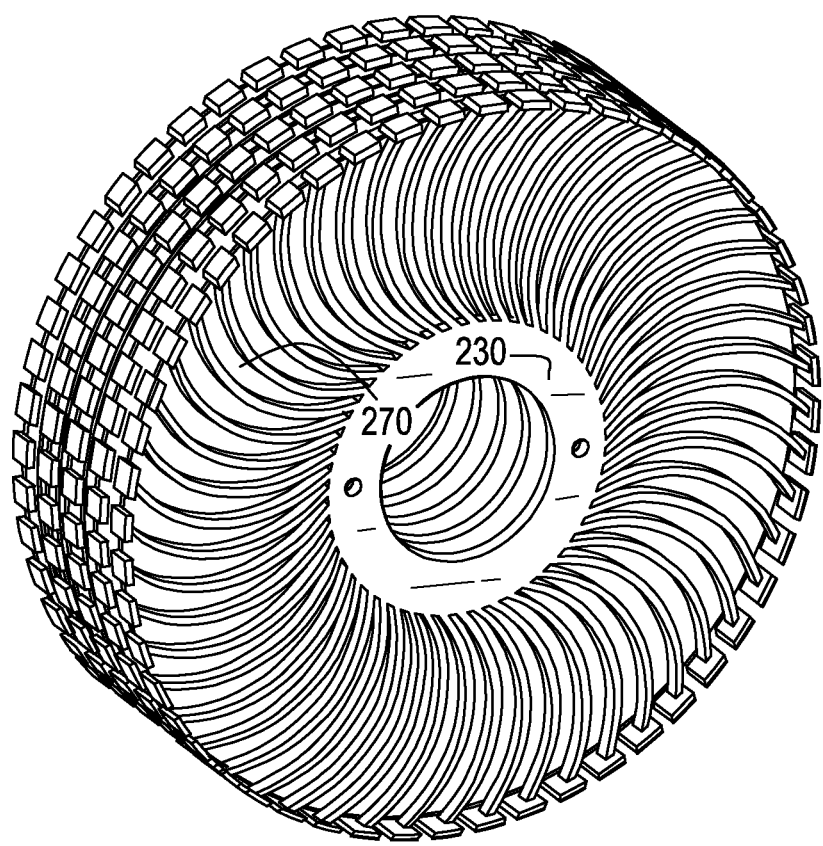
FIG. 10 schematically depicts a plurality of traction disks and deflection limiting disks wherein the traction disks and the deflection limiting disks are axially assembled in an alternating fashion.

FIG. 10 illustrates an alternative exemplary embodiment of a plurality of traction disks 230 and deflection limiting disks 270, wherein the traction disks 230 and the deflection limiting disks 270 are axially assembled in an alternating fashion such that each of the plurality of deflection limiting disks 270 is axially positioned between two of the plurality of traction disks 230. While not limited to any particular amount, axial spacing S (not shown in FIG. 10) between each deflection limiting disk of the plurality of deflection limiting disks and each traction disk of the plurality of traction disks can be such that 0.0 mm≤S≤25 mm.

Figure 11:
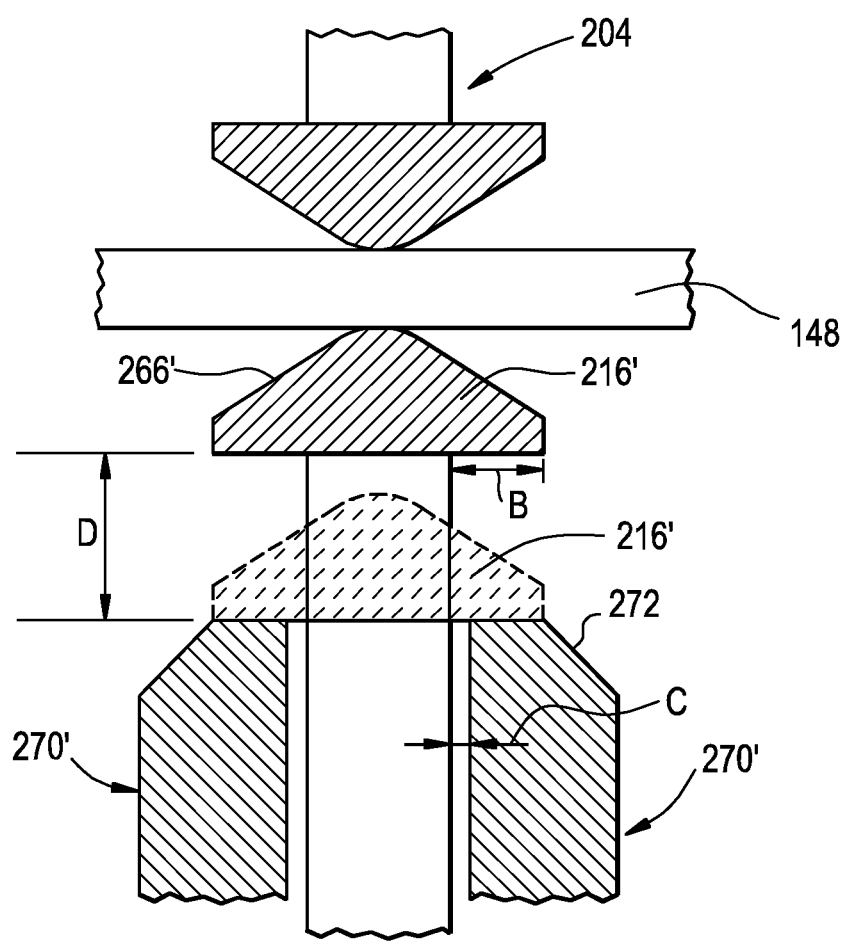
FIG. 11 schematically depicts an exploded side view of an outer radial area of a traction disk radially positioned between two deflection limiting disks.

FIG. 11 illustrates an exploded side view of an outer radial area of a traction disk radially positioned between two deflection limiting disks 270', the deflection limiting disks 270' being the same as those shown in FIG. 10, but with an outer radial beveled surface 272'. Deflection limiting disks include spring elements 204 that extend to a contact foot 216', the contact foot 216' being the same as shown in FIG. 10, but with outer radial beveled surfaces 266'. Contact foot 216' extends axially in at least one direction (represented by length B) to an extent that is greater than an axial distance between a face of the annular hub of the traction disk and a face of the at least one deflection limiting disk 270' that is closest to the traction disk (represented by length C). Upon sufficient application of force to contact foot 216', spring elements 204 deflect in a radial inward direction until a radially inward facing surface of contact foot 216' engages a radially outward facing surface of at least one deflection limiting disk 270', thereby limiting the inward radial deflection of each spring element 204 by a predetermined amount (represented by length D).

While FIGS. 8-11 illustrate embodiments where each spring element of the plurality of spring elements includes a contact foot integrally formed with the end of each spring element, the concept embodied in FIGS. 8-11 can also be applied to embodiments where, as shown in FIG. 7, a rim joins the end of each spring element of the plurality of spring elements to the end of an adjacent spring element on a single traction disk.

For example, in an analogous manner as the embodiment illustrated in FIGS. 8, 9A, and 9B, at least one deflection limiting element can include a pin that extends axially outward relative to a face of at least one deflection limiting disk, the pin engaging the rim upon a predetermined amount of inward radial deflection of each spring element, thereby limiting the inward radial deflection of each spring element.

Alternatively, in an analogous manner as the embodiment illustrated in FIGS. 10 and 11, the rim can extend axially in at least one direction to an extent that is greater than an axial distance between a face of an annular hub and a face of at least one deflection limiting disk. A radially inward facing surface of the rim can then engage a radially outward facing surface of at least one deflection limiting disk upon a predetermined amount of inward radial deflection of each spring element, thereby limiting the inward radial deflection of each spring element.

Materials from which the deflection limiting disk (such as those shown in FIGS. 8-11) can be made include, for example, metals, ceramics, metal matrix composites, and mineral-based materials. For example, the traction disks may be formed from nickel-based alloys including, without limitation, Rene 41, Haynes 282, Inconel 718, or similar nickel-based alloys. The deflection limiting disks may also be formed from steels or steel-based alloys, including, for example, 300 series Stainless Steels. Examples of suitable ceramic materials include, without limitation, silicon nitride, silicon carbide, alumina, boron carbide, SIALONs, or similar ceramic materials. Suitable mineral materials include, without limitation, bulk mica materials such as phlogopite mica.

The predetermined amount of inward radial deflection of the plurality of spring elements may depend on a number of factors, including, but not limited to the material of which the spring elements are made, the geometric shape or configuration of the spring elements, and the environment (e.g., temperature, etc.) in which the pulling rolls are expected to typically operate. Generally speaking, the predetermined amount should preferably be selected so as to limit the radial inward deflection of the spring elements so as not to strain the spring elements beyond their yield point, such that plastic deformation of spring elements does not appreciably occur.

In certain exemplary embodiments, the predetermined amount of inward radial deflection of the plurality of spring elements ranges from 1% to 25%, such as from 1% to 10% of the radial distance between the end and the base of the spring elements. In certain preferred embodiments, the predetermined amount of inward radial deflection of the plurality of spring elements can range from, for example, 0.1 to 10 millimeters, such as from 0.25 to 5 millimeters.

Referring again to FIGS. 2 and 10, the individual traction disks 210 are assembled onto the shaft member 202 such that the keyway 250 of each traction disk 210 engages with the key 225 formed on the shaft member 202. In the embodiment of the pulling roll 200 depicted in FIG. 2, traction disks 210 are positioned against the shoulder 222 and a nut (not shown) is threaded onto thread 224 of the shaft member to secure the traction disks on the shaft member 202 thereby forming the compliant cover assembly 208 of the pulling roll. In some embodiments, each traction disk is positioned on the shaft member such that an axial spacing S between adjacent traction disks (i.e., the spacing in the z-direction of the coordinate axes shown in FIG. 2) is from about greater than 0.0 mm to about 25 mm or even from about 0.0 mm to about 25 mm. In some embodiments, the axial spacing S between adjacent traction disks may be from about 0.75 mm to about 6 mm. The axial spacing S between the adjacent traction disks, in conjunction with the spacing G (shown in FIG. 3) between spring elements on a single traction disk, allows debris to penetrate into the compliant cover assembly 208 and pass through the compliant cover assembly rather than embedded at the surface of the complaint cover assembly thereby preventing damage to the glass sheet during the down-draw process.

In the embodiment of the pulling roll 200 depicted in FIG. 2, the individual traction disks 210 are keyed such that each traction disk is rotationally offset from adjacent traction disks when the traction disks are positioned on the key 225 and, as such, the spring elements of axially adjacent traction disks are not aligned with one another. However, in other embodiments, the individual traction disks 210 may be identically keyed such that the spring elements of axially adjacent traction disks are aligned with one another.

Referring now to FIGS. 1B and 11, during a down-draw glass forming process, the pulling rolls 200a, 200b of the draw assembly 150 contact the glass sheet 148 on a first planar surface 149 and a second planar surface 152, respectively, such that at least the ends 212 of the spring elements 204 contact the glass sheet. As each spring element contacts the surface of the glass sheet, the spring elements deflect radially inward, towards the center of the annular hub 206 (i.e., in the direction of arrow 350), communicating a torque from the shaft member to the glass sheet 148 thereby drawing the glass sheet in the downstream direction 151. For example, as depicted in FIG. 11, the pulling roll is rotating in a counter-clockwise direction 153. Spring elements 204a and 204c are not in contact with the surface 149 of the glass sheet 148 and, as such, spring elements 204a and 204c are not deflected. However, as spring element 204b rotates into contact with the surface 149 of the glass sheet 148, the spring element deflects radially inward, towards the center of the annular hub 206, as the rotating shaft member exerts a torque on the glass sheet through the pulling roll thereby drawing the glass in the downstream direction 151.

Still referring to FIG. 11, in the event that debris or other particulate matter is present on the surface 149 of the glass sheet 148, such as particle 300, the spring elements 204 that contact the particle 300 as the glass sheet 148 is drawn in the downstream direction 151 are deflected radially inward by the particle 300 thereby reducing the point loading of the particle 300 against the surface 149 of the glass sheet 148 and, as a result, mitigating damage to the glass sheet. Moreover, any point loading of the particle 300 against the surface of the glass sheet 148 is limited to a single spring element or a localized group of immediately adjacent spring elements depending on the size of the particle. As a result, the remainder of the spring elements remain in contact with the glass sheet and continue to impart the drawing force to the glass sheet.

It should now be understood that the pulling rolls described herein can be used in a glass manufacturing process to draw and/or guide glass sheets. Specifically, spring elements of the traction disks present a smooth, resilient contact surface with which a glass sheet can be contacted without imparting damage to the surface of the glass sheet. Because the pulling roll is constructed from materials suitable for use at elevated temperatures, the pulling rolls do not readily degrade with prolonged use at elevated temperatures or shed particulate matter and/or debris that could contaminate the glass drawing process. Further, the spring elements of the traction disks are sufficiently resilient in the axial, radial and tangential directions to facilitate enveloping particulate matter in between the spring elements reducing damage to the glass sheet.

The spring elements of the pulling rolls described herein increase the radial compliance of the roll thereby providing a more uniform drawing force to a glass sheet. Moreover, the spring elements also provide for an increased contact area of the roll surface while decreasing the contact pressure and shear forces imparted to the glass sheet. In particular, the spring elements mitigate or eliminate particle-derived point loading on the surface of the glass sheet that, in turn, reduces cracking and/or catastrophic failure of the glass sheet.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A pulling roll for drawing glass sheet in a down-draw process, the pulling roll comprising:
    a shaft member; and
    a compliant cover assembly positioned on the shaft member, the compliant cover assembly comprising at least one traction disk positioned on the shaft member and at least one deflection limiting disk positioned on the shaft member, wherein the at least one traction disk comprises:
    an annular hub; and
    a plurality of spring elements integrally formed with the annular hub, the plurality of spring elements projecting outward from the annular hub such that an end of each spring element of the plurality of spring elements is positioned radially outward from a base of each spring element of the plurality of spring elements; and
    wherein the at least one deflection limiting disk comprises at least one deflection limiting element positioned on the deflection limiting disk, the at least one deflection limiting element engaging at least a portion of the traction disk upon a predetermined amount of inward radial deflection of the plurality of spring elements, thereby limiting the inward radial deflection of the plurality of spring elements.

2. The pulling roll of claim 1, wherein each of the plurality of spring elements has a radial spring constant in a range from about 2 lbf/mm to about 2000 lbf mm wherein, when the compliant cover assembly is engaged with a planar surface of the glass sheet, at least a portion of the plurality of spring elements deflect radially inward, towards a center of the annular hub, thereby preventing damage to the glass sheet.

3. The pulling roll of claim 1, wherein each spring element of the plurality of spring elements is curved between the end and the base.

4. The pulling roll of claim 1, wherein each spring element of the plurality of spring elements further comprises a contact foot integrally formed with the end of each spring element.

5. The pulling roll of claim 4, wherein said at least one deflection limiting element comprises a pin that extends axially outward relative to a face of the at least one deflection limiting disk, the pin engaging the contact foot upon a predetermined amount of inward radial deflection of each spring element, thereby limiting the inward radial deflection of each spring element.

6. The pulling roll of claim 4, wherein said contact foot extends axially in at least one direction to an extent that is greater than an axial distance between a face of the annular hub and a face of at least one deflection limiting disk, a radially inward facing surface of the contact foot engaging a radially outward facing surface of at least one deflection limiting disk upon a predetermined amount of inward radial deflection of each spring element, thereby limiting the inward radial deflection of each spring element.

7. The pulling roll of claim 1, further comprising a rim joining the end of each spring element of the plurality of spring elements to the end of an adjacent spring element on a single traction disk.

8. The pulling roll of claim 7, wherein said at least one deflection limiting element comprises a pin that extends axially outward relative to a face of the at least one deflection limiting disk, the pin engaging the rim upon a predetermined amount of inward radial deflection of each spring element, thereby limiting the inward radial deflection of each spring element.

9. The pulling roll of claim 7, wherein said rim extends axially in at least one direction to an extent that is greater than an axial distance between a face of the annular hub and a face of at least one deflection limiting disk, a radially inward facing surface of the rim engaging a radially outward facing surface of at least one deflection limiting disk upon a predetermined amount of inward radial deflection of each spring element, thereby limiting the inward radial deflection of each spring element.

10. The pulling roll of claim 1, wherein the predetermined amount of inward radial deflection of the plurality of spring elements ranges from 1% to 25% of the radial distance between the end and the base of the spring elements.

11. The pulling roll of claim 1, wherein the at least one traction disk comprises a plurality of traction disks and each traction disk is rotationally offset from adjacent traction disks in a circumferential direction.

12. The pulling roll of claim 1, wherein the compliant cover assembly is formed from a metallic material, a ceramic material, or a mineral material.

13. The pulling roll of claim 1, wherein the compliant cover assembly is formed from a nickel-based alloy.

14. The pulling roll of claim 1, wherein each of the plurality of spring elements has an axial spring constant from about 0.25 lbf/mm to about 150 lbf/mm.

15. A pulling roll for drawing glass sheet in a down-draw process, the pulling roll comprising:
a shaft member; and
a compliant cover assembly positioned on the shaft member, the compliant cover assembly comprising a plurality of traction disks and a plurality of deflection limiting disks positioned on the shaft member, wherein each traction disk of the plurality of traction disks is rotationally offset from adjacent traction disks and each traction disk of the plurality of traction disks comprises:
an annular hub;
a plurality of spring elements integrally formed with the annular hub, the plurality of spring elements projecting outward from the annular hub such that an end of each spring element of the plurality of spring elements is positioned radially outward from a base of each spring element of the plurality of spring elements; and wherein:
each deflection limiting disk of the plurality of deflection limiting disks comprises at least one deflection limiting element positioned on each deflection limiting disk, the at least one deflection limiting element engaging at least a portion of at least one traction disk upon a predetermined amount of inward radial deflection of the plurality of spring elements, thereby limiting the inward radial deflection of the plurality of spring elements.

16. The pulling roll of claim 15, wherein each of the plurality of deflection limiting disks is axially positioned between two of the plurality of traction disks.

17. The pulling roll of claim 16, wherein an axial spacing S between each deflection limiting disk of the plurality of deflection limiting disks and each traction disk of the plurality of traction disks is such that $0.0 \text{ mm} \leq S \leq 25 \text{ mm}$.

* * * * *